May 1, 1962

J. G. LEE ET AL 3,032,120

HELICOPTER WITH JET DRIVEN BLADES

Filed July 11, 1960

INVENTORS
JOHN G. LEE
DAVID S. JENNEY

BY Leonard F. Weklind

ATTORNEY

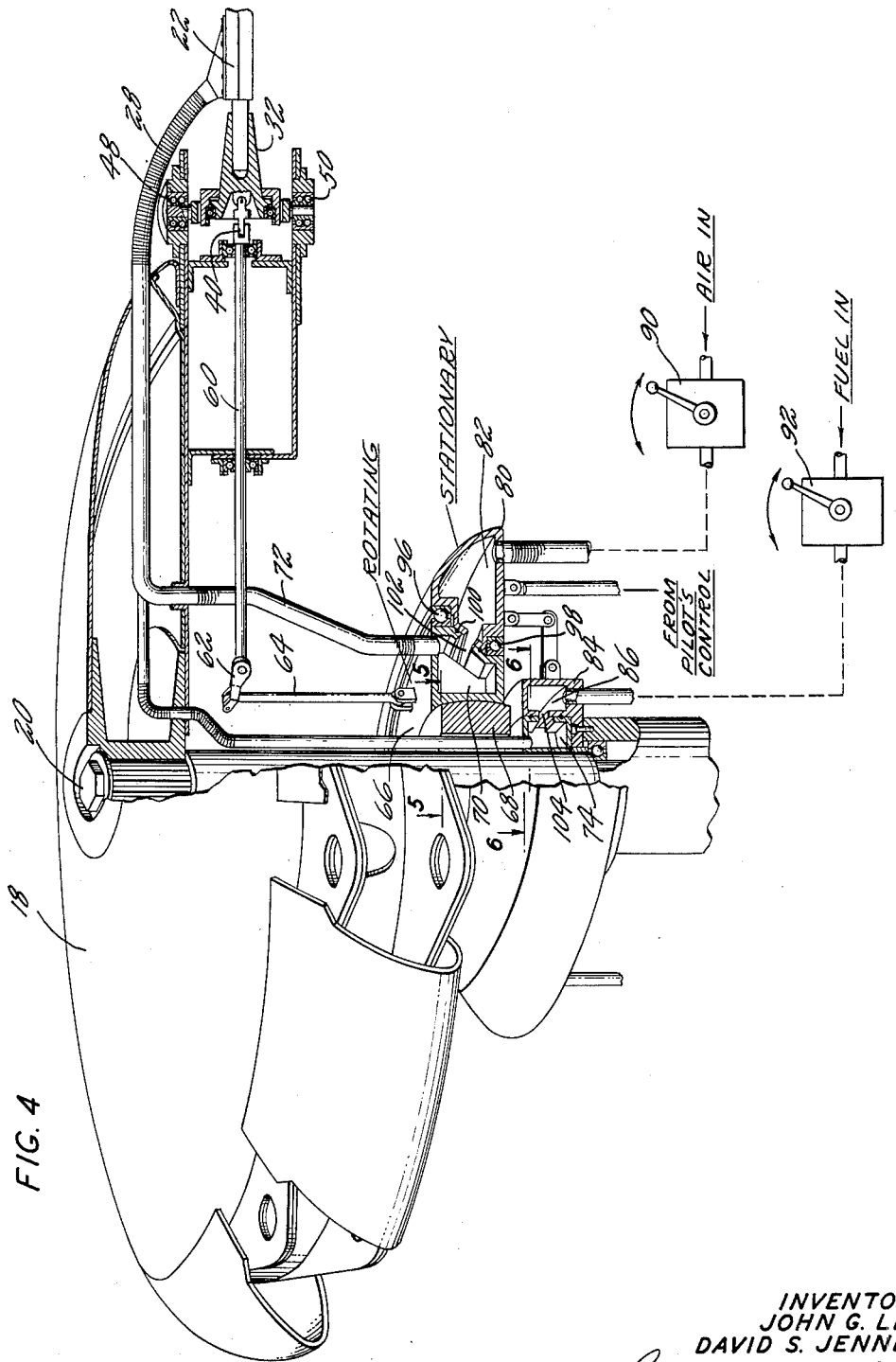

May 1, 1962    J. G. LEE ET AL    3,032,120
HELICOPTER WITH JET DRIVEN BLADES
Filed July 11, 1960                3 Sheets-Sheet 3

INVENTORS
JOHN G. LEE
DAVID S. JENNEY
BY Leonard F. Weklind
ATTORNEY

United States Patent Office

3,032,120
Patented May 1, 1962

3,032,120
HELICOPTER WITH JET DRIVEN BLADES
John G. Lee, Farmington, and David S. Jenney, Manchester, Conn., assignors to United Aircraft Corporation, East Hartford, Conn., a corporation of Delaware
Filed July 11, 1960, Ser. No. 42,091
2 Claims. (Cl. 170—135.4)

This invention relates to helicopter rotor systems and more particularly to rotors having once per revolution lead-lag motion of the blades.

It is an object of this invention to increase the maximum forward speed of helicopters by providing a temporary lag motion of the advancing rotor blade and a temporary lead motion of the retreating blade substantially in the plane of rotation.

One form of mechanism for providing a lead-lag motion of the blades of a helicopter rotor is disclosed in Patent No. 2,934,151, issued April 26, 1960 to David S. Jenney. That patent disclosed a mechanical arrangement which caused aerodynamic forces on the rotor blades to provide actuation for the lead-lag motion; however, such a system may introduce problems of high blade stresses or high rotor-head weight.

Accordingly, it is an object of this invention to provide a simple mechanism for providing lead-lag motion of helicopter rotor blades by systematically altering the power which drives the rotor blades.

A more specific object of this invention is to provide propulsion units carried by the blades with means for controlling the thrust output of these units during each revolution.

A still further object is to provide this thrust variation in a substantially automatic arrangement.

These and other objects of this invention will become readily apparent from the following detailed description of the drawings in which:

FIG. 4 is a perspective illustration in partial section indicating the major elements of the rotor assembly;

Figure 1:
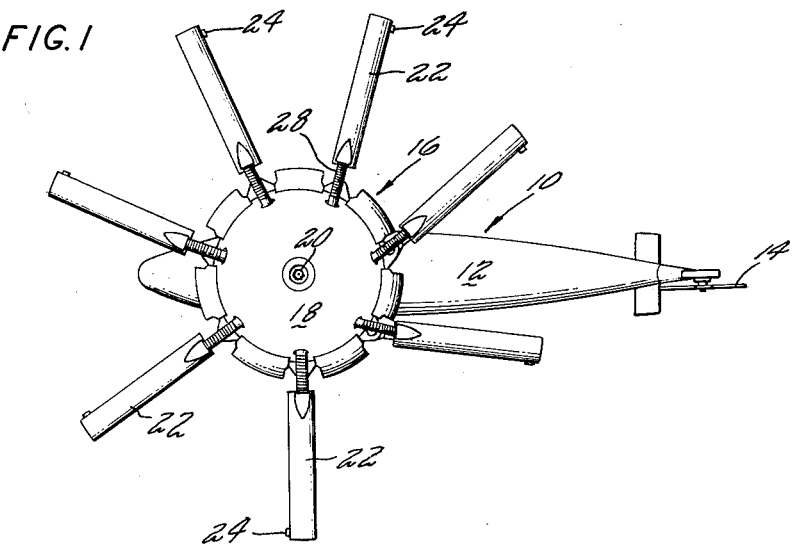
FIG. 1 is a schematic plan view of a helicopter having a rotor arrangement according to this invention.
Figure 2:
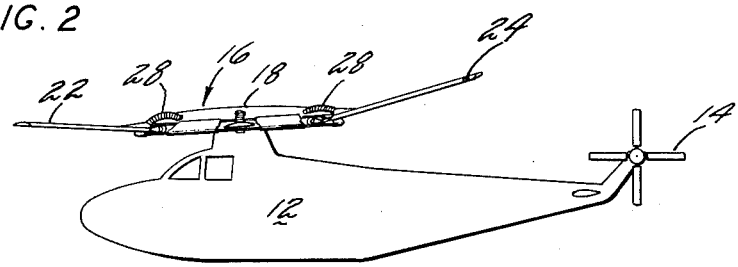
FIG. 2 is a side elevation of FIG. 1.

Referring to FIG. 1, a helicopter is generally indicated at 10 as having a main fuselage 12 and a control tail rotor 14. A main sustaining rotor 16 is provided for comprising a substantially streamlined disc portion 18 which may be mounted for rotation on a central gear driven shaft 20. Each of the blades 22 includes a propulsive thrust nozzle 24 which may expel air or products of combustion to drive each individual blade. The propulsive fluids are conducted via one or more flexible ducts 28 from within the rotor disc 18 (see also FIG. 2).

The propulsion unit 24 may be fed with compressed air, or products of combustion may be expelled therefrom after they are burned in a suitable combustion chamber, as for example, the jet-type, blade-tip propulsion power plants such as shown in Patent No. 2,660,859, issued December 1, 1953 to John Chamberlain.

Figure 3:
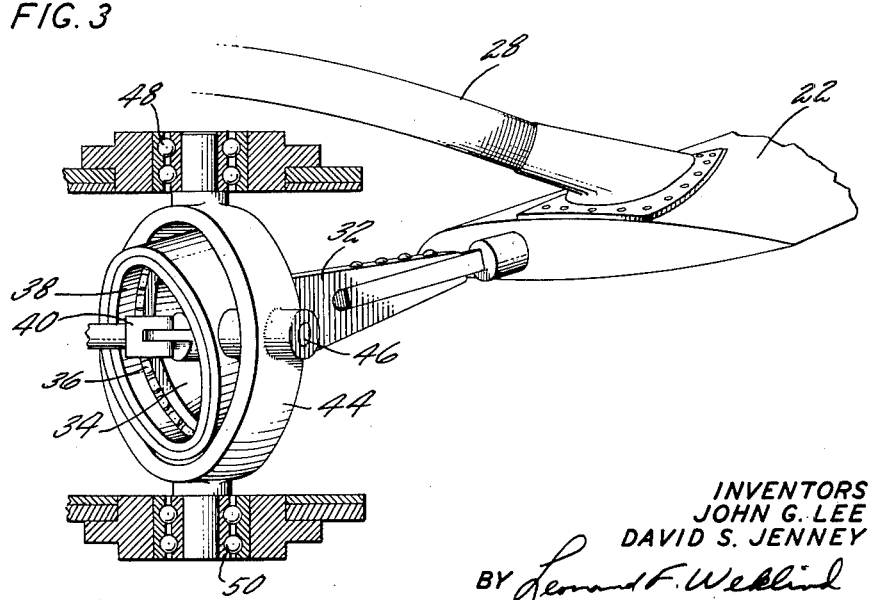
FIG. 3 is an enlarged detail perspective of a rotor hinge assembly.

FIG. 3 illustrates a typical hinge arrangement for each of the blades 24. Thus, the inner end of the blade has a shank member 32 which carries at its inboard end an inner bearing race 34 which cooperates with the ball bearings 36 and the outer race 38, thus forming a bearing assembly. The shank end 32 includes a double universal joint 40 which can provide the necessary total and cyclic pitch changes for the blades.

The outer race 38 is connected to a yoke 44 by means of a pivot pin 46. The yoke 44 is suitably mounted in vertical support bearings 48 and 50, thereby giving the blade 24 an actual gimballed support. The bearings 48 and 50 permit the blade to achieve its lead-lag motion relative to the remaining blades.

Referring to FIG. 4, the blade support arrangement and the accompanying rotor construction is more clearly illustrated. Thus, for example, the cyclic and total pitch changes of the blade may be provided by means of a torque arm 60 which may be rotated through a lever 62 through a vertical push-pull rod 64 carried by the rotating swash plate 66. The swash plate 66 may be tilted about the ball-like socket joint 68 for cyclic pitch changes of the blades and the entire assembly raised or lowered to provide total pitch changes, as is well-known in the art.

Figure 8:
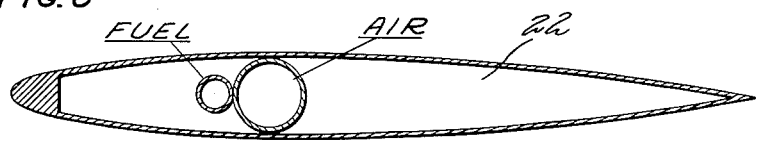
FIG. 8 is a typical blade section.

The swash plate 66 includes a hollow chamber 70 which is one of a number of segments, each of which is connected to an air-supply tube 72 leading in turn to a flexible duct 28. A second rotating segmented chamber 74 is provided (see also FIG. 6), which connects to one of the fuel lines 76 leading in turn out to the blade tip via the flexible duct 28. A typical section through the blade is shown in FIG. 8.

Still referring to FIG. 4, an annular stationary portion of the swash plate 80 surrounds the rotating swash plate 66 and includes an air chamber 82. A similar stationary member 84 carries an annular fuel chamber 86. A slotted passage 104 provides communication between the chambers 74 and 86. The total amount of air and fuel supply may be suitably controlled by a manual air valve 90 and a manual fuel valve 92, respectively.

The outer stationary disc 80 and the inner disc-like swash plate 66 are mounted in suitable bearings 96 and 98 and include suitable seals 100 therebetween. The engaging surfaces of the member 80 and the swash plate 66 include cooperating ports 102. Thus the port 102 serves to vary air flow during each rotor cycle and port 104 varies fuel flow.

Figure 6:
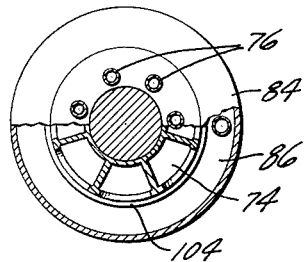
FIG. 6 is a section taken along the line 6—6 of FIG. 4.
Figure 5:
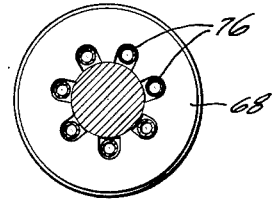
FIG. 5 is a section taken along the line 5—5 of FIG. 4.
Figure 7:
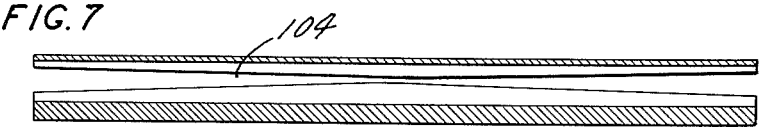
FIG. 7 is an unwrapped showing of the fluid flow control slot of the rotor valve arrangement.

As best seen in FIG. 6, the fuel chamber 86 can communicate with each of the chambers 74 during the relative rotation of the inner and outer discs. The fuel passages are shown in FIGS. 5 and 6, but the air passages are substantially identical, except much larger. The port 104 between the inner and outer disc portions are shown unfolded in FIG. 7. It will be seen that the fuel flow will decrease and then increase again during each revolution. Thus, each segment of chamber 74 will be exposed to a cyclic variation in fuel flow which will have a predetermined variation during each revolution. This variation is determined by the profile of the slot or port 104 at any predetermined azimuth position on the blades. The same is true for the air chamber 82 and the segmented cooperating chamber 70.

The total air or fuel flow can be regulated by the air and fuel valves 90, 92.

Figure 9:
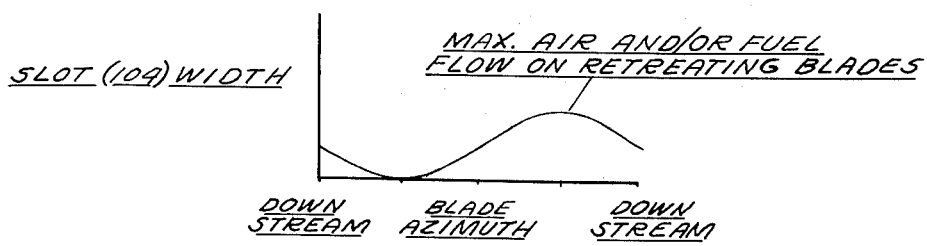
FIG. 9 is a diagrammatic illustration of the flow variation.

The slot width and resulting air and/or fuel flow is diagramamtically shown in FIG. 9. The particular profile of the slot 104 will be chosen for the particular blade configuration that may be used.

The blades are normally pivoted at a point from the center of rotation of the rotor which is approximately 40 percent of the radius of the rotor blade assembly. The entire arrangement must be tuned to have a resonant lead and lag once per revolution. A 90° phase lag between the maximum thrust and maximum displacement will result so that the maximum thrust should be provided on the retreating blade.

As a result of this invention, it will be apparent that an extremely light weight and efficient arrangement has been provided for cyclically providing a lead-lag motion to each blade of a helicopter rotor assembly. Complex interconnecting linkages normally necessary to provide such a lead-lag motion are completely eliminated, thus reducing over-all weight. Furthermore, the valving arrangement is such that the lead-lag motion is produced automatically as thrust is applied to the jets at the blade tips.

It should be understood that air alone may be utilized as the propulsive fluid or fuel and an oxidizer may be conducted to suitable combustion chambers for burning and eventual expulsion of gases through the tip jet nozzle.

Although one embodiment of this invention has been illustrated and described, it will be apparent that various changes and modifications may be made in the construction and arrangement of the various parts without departing from the scope of this novel concept.

What it is desired by Letters Patent is:

1. A helicopter having a fuselage and a rotor, said rotor having an axis of rotation, a plurality of blades extending from said rotor and terminating in free tips, means carried by said rotor and mounting each of said blades for pitch changing motion and for lead-lag motion relative to said rotor, said mounting means being located outboard more than 30% of the distance from said axis to said tips, fluid propulsion means carried by each of said blades, a source of fuel and a source of oxidizer, means for conducting fuel and oxidizer from said sources to each of said propulsion means, and means for controlling the flow of fuel and oxidizer and the thrust of said propulsion means for cyclically continuously varying the propulsive thrust of said propulsion means including two pairs of relatively rotating cooperating valve elements carried by said rotor and fuselage, respectively, each pair of valve elements forming an opening, one pair of valve elements regulating the flow of fuel and the other pair of valve elements controlling the flow of oxidizer, both said pairs of valve elements being continuously open and each said opening varying flow in a fixed schedule per revolution of said rotor.

2. A helicopter according to claim 1 including means for regulating the flow of fuel and oxidizer to said pairs of valve elements.

References Cited in the file of this patent

UNITED STATES PATENTS

| | | |
|---|---|---|
| 2,606,728 | Sikorsky | Aug. 12, 1952 |
| 2,620,882 | Morain | Dec. 9, 1952 |
| 2,669,836 | Abbott | Feb. 23, 1954 |
| 2,686,567 | Costa | Aug. 17, 1954 |
| 2,915,129 | Laskowitz | Dec. 1, 1959 |
| 2,934,151 | Jenney | Apr. 26, 1960 |

FOREIGN PATENTS

| | | |
|---|---|---|
| 811,394 | France | Jan. 14, 1937 |
| 634,332 | Great Britain | Mar. 15, 1950 |